United States Patent [19]

Langer

[11] Patent Number: 4,552,070

[45] Date of Patent: Nov. 12, 1985

[54] INSULATING LAYER FOR SOLID FUEL ROCKET ENGINES

[75] Inventor: Heinz G. Langer, Gauting, Fed. Rep. of Germany

[73] Assignee: Messerschmitt-Bölkow-Blohm GmbH, Fed. Rep. of Germany

[21] Appl. No.: 411,514

[22] Filed: Aug. 25, 1982

[30] Foreign Application Priority Data

Aug. 26, 1981 [DE] Fed. Rep. of Germany ....... 3133787

[51] Int. Cl.$^4$ ............................................. F42B 15/00
[52] U.S. Cl. ....................................... 102/290; 60/909
[58] Field of Search .......................... 102/290; 60/909

[56] References Cited

U.S. PATENT DOCUMENTS

| 2,811,467 | 10/1957 | Hull et al. | 60/909 |
| 3,124,542 | 3/1964 | Kohn | 60/909 |
| 3,636,881 | 1/1972 | Godfrey | 102/290 |
| 3,916,618 | 11/1975 | Araki et al. | 102/290 |
| 4,001,126 | 1/1977 | Marion et al. | 102/290 |
| 4,092,186 | 5/1978 | Gordon et al. | 102/290 |
| 4,365,558 | 12/1982 | Lippler et al. | 102/290 |

OTHER PUBLICATIONS

Hawley, *The Condensed Chemical Dictionary*, 9th Ed., pp. 800-801, Van Nostrand Reinhold Co. (1977), New York.

*Primary Examiner*—Edward A. Miller
*Attorney, Agent, or Firm*—McGlew and Tuttle

[57] ABSTRACT

A solid fuel rocket engine comprises a casing which defines a combustion chamber with a solid propellant charge in the combustion chamber and an insulating layer of a water containing alkali silicate and fibers disposed between the casing and the charge. The layer is a type which will froth at a predetermined temperature which occurs during burn off of the propellant charge so that it increases in its thickness dimension in the area of the hot gases which develop and provides an adequate insulation. A method of producing the layer comprises heating the alkali silicate layer to a temperature in which it becomes plastic and sheathing the propellant charge with the plastic layer. Thereafter the sheath charge is inserted into the combustion chamber casing leaving an annular gap between this layer and combustion chamber casing. Thereafter heat is applied to the vicinity of the chamber to cause the layer to froth and expand to close the annular gap. It is advantageous to include a lining of a plastic alkali layer in addition to the layer which sheaths the propellant charge between it and the casing. In addition, it is sometimes advantageous to add a plastic foam material in the gap between the sheath, the cover charge and the casing.

4 Claims, 1 Drawing Figure

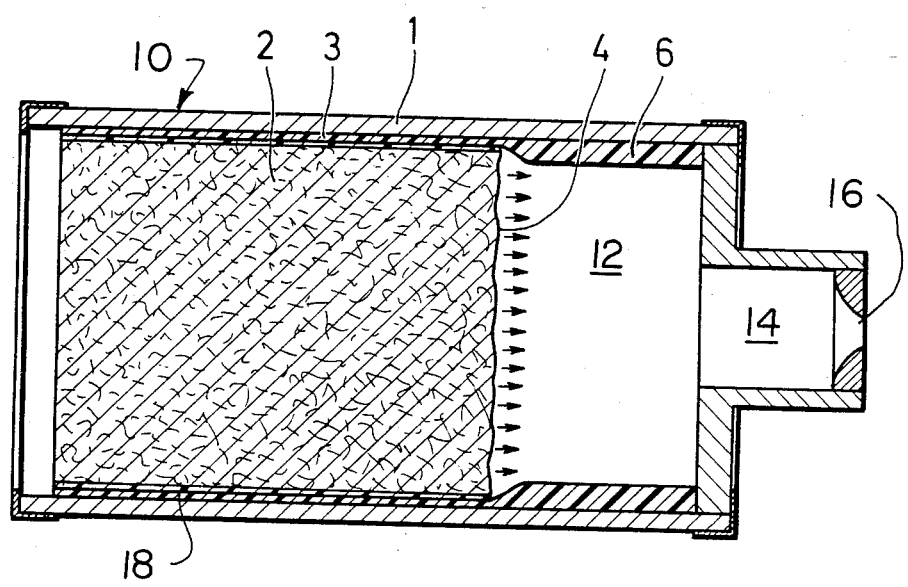

INSULATING LAYER FOR SOLID FUEL ROCKET ENGINES

FIELD AND BACKGROUND OF THE INVENTION

The invention relates in general to rocket engines and in particular to a new and useful rocket engine having an insulating layer on the outer circumference of its propellant charge and/or the inner side of the combustion chamber casing of a rocket engine and to a method of producing the insulating layer.

The propellant insulating layer of ramjet rockets is intended to heat insulate the propellant charge against heating by the air friction of the rocket in order to prevent impairment of the burnoff and hence of the compressive work range of the propellant charge, and also is intended to protect the combustion chamber casing from too great a heating by the combustion gases. Since with increasing thickness of the propellant insulating layer the diameter of the propellant charge and hence the range of the rocket is reduced, another desideratum is to meet the named requirements by as thin as possible an insulating layer.

It is known practice to produce the propellant insulating layer of plastic, e.g. polybutadiene (German No. OS 27 58 814). However, as the plastic melts and decomposes in the presence of the combustion gases, heating of the combustion chamber casing to high temperatures is not prevented thereby. Also it has been proposed to incorporate the inorganic materials, such as alkali silicates, into the plastic to increase the heat transmission resistance of the insulating layer to the combustion gases (U.S. Pat. No. 3,916,618). As the plastic matrix melts and decomposes quickly nevertheless, the effect achieved thereby is very slight, however.

SUMMARY OF THE INVENTION

The invention provides an insulating layer at the outer circumference of a propellant charge and/or on the inner side of the combustion chamber casing inclusive of the casing of the aftercombustion chamber, of a rocket engine, which at small layer thickness, not only prevents excessive heating of the propellant charge by the air friction of the rocket, but moreover assures that the combustion chamber casing undergoes only slight heating during the combustion. The invention also provides a method especially suitable for the production of the insulating layer.

Water containing or hydrated alkali silicate layers which are free of polymer binder and are interspersed with fibers or mats and which froth at high temperatures are used in the building trade as fire protection boards. They have a water content of 20 to 70 wt %. Glass fibres are used as the fibers of the invention, and glass fibers or wire mesh are used as the mats. The fibers or mats are employed in a quantity of 2 to 40 wt. %, preferably 5 to 25 wt %, referred to the alkali silicate contained in the board. The frothing occurs under the action of high temperatures, as they occur e.g. in case of fire, with the water contained in the board boiling away. An alkalai silicate board of a thickness of 2 mm will lead to a foam layer about 15 mm thick, of very low heat conductivity (about 0.06 W/k.m). For the formation of the foam layer an expansion pressure of about 5 bar is regarded to be necessary. Above about 950° C. the foam layer coalesces again (see German No. AS 1 658 806, also the publication "Palusol-Brandschutzplatten" Palusol Fire Protection Boards, of the firm BASF AG, Ludwigshfen, Federal Republic of Germany). Besides, the foam layer formed is brittle.

In the gas generator of a rocket engine a high pressure, for example 30 bar, is built up. The temperature in the gas generator is for example 1300° C. It is substantially higher still in the aftercombustion chamber. The flow velocity of the combustion gases is considerable (e.g. 0.3 Mach in the aftercombustion chamber).

It must now be regarded to be surprising that the water containing, foamable alkali silicate layer known from the building trade will, despite the named condition, fully develop its excellent heat insulating properties both in the gas generator or in the aftercombustion chamber of a rocket engine.

The reason why the alkali silicate layer expands despite the counter pressure of e.g. 30 bar in the rocket engine would seem to be the high temperature of the combustion gases and the correspondingly high steam pressure in the layer. Also, the melting process of the alkali silicate layer lasts relatively long even at the named high temperatures (e.g. 10 minutes), so that during a burning time of the propellant charge of for example 1 to 2 minutes, the foam layer coalesces only slightly, so that its heat transmission resistance is hardly affected.

Thus, during burning of a propellant charge sheathed with a 2 mm thick alkali silicate layer according to the invention, a temperature increase of as little as 5° C. was measured on the outside of the combustion chamber casing consisting of a steel skin.

Hence a lower grade of steel may be used for the production of the steel skin. Moreover, the use of longer propellant charges and hence a corresponding increase of the range is possible. Another advantage of the alkali silicate layer is its low price.

It is known that by addition of water the ignition temperature of a boron propellant charge is lowered and thereby a more complete combustion in the aftercombustion chamber is achieved. The steam escaping from the insulating layer according to the invention aids this effect.

Accordingly it is an object of the invention to provide a solid fuel rocket engine which comprises a casing which defines a combustion chamber having a solid propellant charge in the chamber and an insulating layer of a water containing alkali silicate disposed between the casing and the charge, the layer frothing during burnoff of the propellant charge to fill the space in the combustion chamber between the charge and the layer.

A further object of the invention is to provide a method of positioning a propellant charge in a solid fuel rocket engine casing which comprises heating an alkali silicate layer to a temperature at which it becomes plastic and applying it around the propellant charge to sheath the charge, inserting the sheath charge into the combustion chamber casing of the rocket engine to leave an annular gap between the silicate layer and the casing thereafter heating the layer to a temperature at which the layer froths and expands to close the annular gap.

A further object of the invention is to provide an insulating layer for a propellant charge and to provide a solid fuel rocket engine construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

The only FIGURE of the drawing is a partial longitudinal section view of a solid fuel rocket engine constructed in accordance with the invention.

DESCRIPTION OF THE PREFERRED EMBDODIMENTS

Referring to the drawings in particular the invention embodied therein comprises a solid fuel rocket engine generally designated 10 having a substantially cylindrical casing or housing 1 defining a combustion chamber or pre-combustion chamber 12 in which propellant gases are formed by the burning of a solid rocket fuel or propellant 2. Gas is generated in the chamber 12 to pass through a connecting passage 14 having a nozzle 16. A solid propellant charge 2 is of an end burning type and burns along the front end 4. The charge 2 is sheathed in an insulating layer of a water containing a hydrated aklali silicate and fibers 3 which is disposed in the casing between the charge 2 and the interior of the casing. Layer 3 is such that it froths during burnoff for example to a layer 6 in the burned off area having a thickness which is a multiple of the original thickness of the layer 3.

In accordance with the invention, inside the combustion chamber casing 1 of a gas generator, a solid propellant charge 2 of the front burner type is arranged. An annular gap, provided between the outer circumference of the propellant charge 2 and the inner side of casing 1 is filled or partly filled with a layer 3 which comprises a water containing silicate layer which is interspersed with fibers or a mat.

Due to the burning of the propellant charge 2, the layer 3 froths at the burning front 4 to a layer 6 whose layer thickness is a multiple, e.g. 7-fold, of the thickness of layer 3. By the low heat conductivity and great thickness of the foamed layer 6, heating up of the casing 1 is prevented to a very large extent. Also, the thickness of the unfoamed or little foamed layer 3 is sufficient to prevent too great a heating of the propellant charge 2 by the air friction of the rocket.

To produce the insulating layer 3, a water containing sodium silicate board interspersed with fibers or a mat is heated to 60° to 100° C., owing to which it becomes plastic. Such sodium silicate boards are commercially available as fire protection boards. The propellant charge 2 is then sheathed with the plastic sodium silicate layer, it being possible to glue the sodium silicate layer onto the propellant charge by means of a silicone adhesive.

The diameter of the propellant charge 2 sheathed with the sodium silicate layer is slightly smaller than the inside diameter of the casing 1, so that after insertion of the propellant charge 2 in casing 1 an annular gap is formed between the sodium silicate layer and casing 1.

The inner side of casing 1 and/or the outer side of the sodium silicate layer may likewise be provided with a silicone adhesive. Then casing 1 is heated, so that the sodium silicate layer briefly reaches a temperature of more than 100° C., owing to which it froths somewhat and the annular gap between the sodium silicate layer and casing 1 is filled. The propellant charge 2 is then securely held by the layer 3 in casing 1. Also the gap which is formed at the joint of the plastic board or layer when sheathing the propellant charge 2 is closed by this partial frothing.

A reduction of the thickness of layer 3 can be achieved by providing a second layer 18 of a foamed plastic between the alkali silicate layer and the combustion chamber casing. Then the foamed plastic assumes the function primarily to heat insualte the propellant charge against heating by the air friction of the rocket, while the protection of casing 1 from the combustion gases is still perfectly sufficient also with a foamed layer 6 of lesser thickness. The layer of foamed plastic is brought about in that a plastic foam composition is placed in the annular gap between the alkali silicate layer and casing 1 and is allowed to harden.

The alkali silicate layer 3 is provided on both sides with an epoxy resin fabric of a thickness of about 0.1 mm. By the epoxy resin fabric it is prevented that moisture from the alkali silicate penetrates into the propellant charge 2. At the same time the epoxy resin fabric prevents migration of the burnoff accelerator from the propellant charge 2 into the alkali silicate layer 3.

Instead of the above described sheathing of the propellant charge with the alkali silicate layer 3 made plastic by heating, the inner side of the combustion chamber casing 1 can be lined with the alkali silicate layer 3 made plastic by heating, whereupon the alkali silicate layer 3 or the epoxy resin fabric present on it is provided with a bonding aid and then the propellant composition is poured in (case-bonding).

While specific embodiments of the invention have been shown and described in detail to illustrate the application of the principles of the invention, it will be understood that the invention may be embodied otherwise without departing from such principles.

What is claimed is:

1. A solid fuel rocket engine, comprising a casing defining a combustion chamber, a solid propellant charge in said combustion chamber and a heat-responsive, expandable insulating layer consisting essentially of fibers and a hydrated alkali silicate which is free of polymer binder, which insulating layer effects an evaporating foam between said casing and said charge.

2. A solid fuel rocket engine, according to claim 1, wherein said charge is an end burning charge so that burning of the end thereof causes a frothing of the insulating layer to a greater thickness between the burning part of the charge and the associated end of the combustion chamber.

3. A solid fuel rocket engine according to claim 1, including a second layer of a foam plastic disposed between said alkali silicate layer and said casing.

4. A solid fuel rocket engine according to claim 1, including an epoxy resin fabric arranged on each side of said alkali silicate layer.

* * * * *